United States Patent
Nagakura et al.

(10) Patent No.: US 6,619,830 B2
(45) Date of Patent: Sep. 16, 2003

(54) BACK COVER FOR LAMP BODY

(75) Inventors: Akira Nagakura, Shizuoka (JP); Katsumi Takao, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/805,026

(22) Filed: Mar. 12, 2001

(65) Prior Publication Data

US 2002/0093831 A1 Jul. 18, 2002

(30) Foreign Application Priority Data

Mar. 16, 2000 (JP) .................................... P.2000-074082

(51) Int. Cl.[7] .......................... B60Q 1/100; B60Q 3/00; F21V 11/00; F21V 15/01
(52) U.S. Cl. .................. 362/546; 362/362; 362/267
(58) Field of Search ................ 362/546, 362, 362/249, 507, 267; 439/936, 276, 274, 275

(56) References Cited

U.S. PATENT DOCUMENTS

| | | | |
|---|---|---|---|
| 3,755,615 A | * 8/1973 | Paullus et al. ............... 174/76 |
| 4,083,902 A | 4/1978 | Clyde ............................ 264/26 |
| 4,300,189 A | 11/1981 | Shanks ......................... 362/267 |
| 5,060,121 A | 10/1991 | Cunningham et al. ......... 362/61 |
| 5,150,959 A | 9/1992 | Paffrath et al. ................ 362/80 |
| 5,194,021 A | 3/1993 | Oba et al. ..................... 439/589 |
| 5,562,339 A | 10/1996 | Tanaka et al. | |
| 5,664,870 A | 9/1997 | Uchida et al. | |
| 5,700,080 A | 12/1997 | Okuda | |
| 5,879,073 A | 3/1999 | Hori et al. | |
| 6,149,456 A | 11/2000 | Uchiyama .................... 439/488 |
| 6,174,201 B1 | * 1/2001 | Murakami et al. ........... 439/587 |

* cited by examiner

Primary Examiner—Stephen Husar
Assistant Examiner—Sharon Payne
(74) Attorney, Agent, or Firm—Fish & Richardson P.C.

(57) ABSTRACT

A protruding outer wall 702 is provided that surrounds cord insertion holes 704 (704a, 704b) used for inserting power supply cords 6 (6a, 6b) that supply current to light source bulbs 1 (1a, 1b). An inside region 705 of the outer wall 702 is filled with a soft synthetic resin 9 which is then cured. Further, inner walls 703 (703a, 703b) are provided in an interior region 705 so as to ensure air tightness and waterproof performance of the cord insertion holes 704 (704a, 704b). The structure ensures air tightness and waterproof performance of a back cover for a lamp body while reducing the number of man hours required to fix a power supply cord to the back cover.

5 Claims, 5 Drawing Sheets

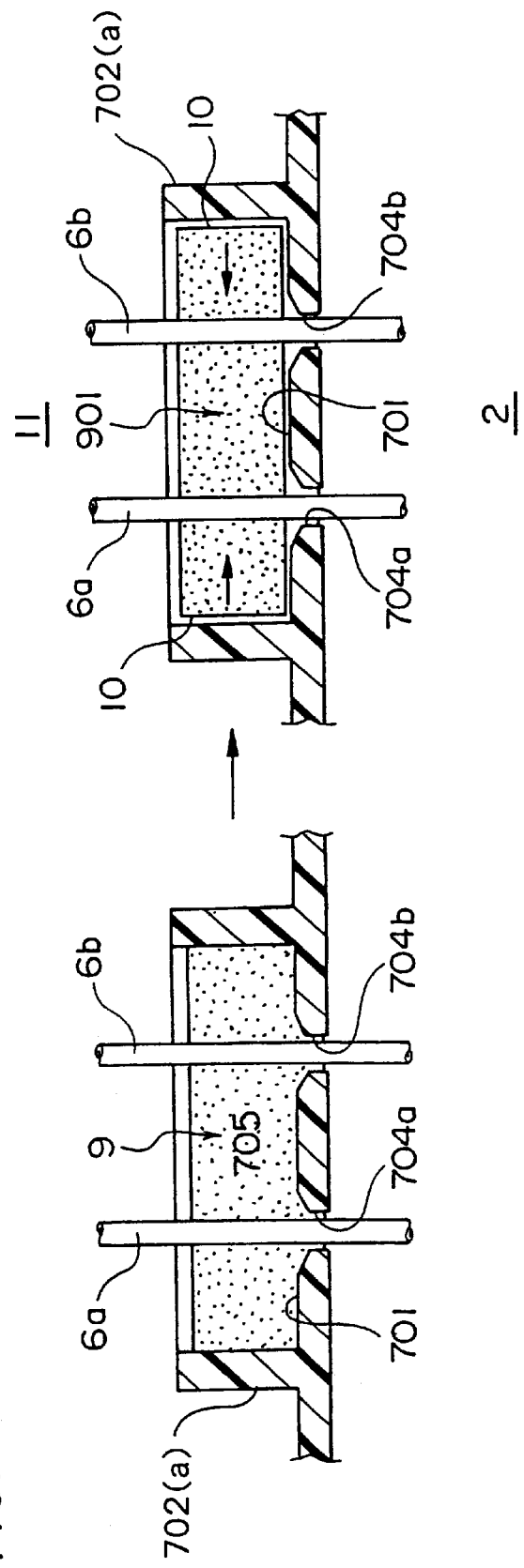

BACK COVER FOR LAMP BODY

BACKGROUND OF THE INVENTION

The present invention relates to a structure and technique for ensuring air tightness and waterproof performance of a cord insertion hole formed on a back cover for light source bulb replacement. The structure is installed at the rear apex of a lamp body, which is a basic construction member of a lamp for a vehicle such as an automobile and motorcycle.

More particularly, the present invention relates to an improvement of a lamp body back cover structure. The goal is to ensure air tightness and waterproof performance of the cord insertion hole by forming a resin mold region around the cord insertion hole formed in the back cover, and filling and curing a soft synthetic resin in the resin mold region.

In general, a back cover for light source bulb replacement is engagingly fixed to a light source bulb insertion opening formed at the rear apex of a generally cup-shaped lamp body that forms a housing of a vehicle lamp such as a headlamp for an automobile and motorcycle.

Conventionally, one or a plurality of power supply cords for supplying current from a power source to a light source bulb disposed inside a housing are inserted and fixed to the back cover for a lamp body. Further, a variety of constructions are proposed for ensuring air tightness and waterproof performance of the clearance formed at the power supply cord insertion portion.

Such constructions typically include,
(1) a first configuration, as shown in FIG. 5(A), wherein all power supply cords 21a, 21b for supplying current to a light source bulb, not shown, are inserted and fixed to a rubber bushing 22. The rubber bushing 22 is fitted into a preformed hole 23 formed in a back cover 20a that is engagingly fixed to a lamp body 21; and
(2) a second configuration, which is an improved configuration, as shown in FIG. 5(B), wherein two cord insertion holes 25a, 25b accommodate respective power supply cords 21a, 21b. The cord insertion holes are provided in a back cover 20b (partially shown) at intervals, and cylindrical projections 26a, 26b are provided so as to surround the respective insertion holes 25a, 25b. Small rubber bushings 24a, 24b, with power supply cords 21a, 21b inserted and fixed therein in advance, are fitted into the respective inner region of the protrusions 26a, 26b, and adhesives 27a, 27b are poured from above the small bushings 24a, 24b so as to provide a seal.

In the first construction of FIG. 5(A) mentioned above, the engagement areas between the bushing 22 and the cord insertion hole portion, and between the bushing 22 and the back cover hole 23 tended to be large due to the relatively large bushing 22 used therein. Also, sufficient air tightness and waterproof performance could not be obtained due to a difference in material of the rubber bushing 22 and the synthetic resin back cover 20a. Other technical problems also arose, such as that fitting of the bushing required some effort.

In the second configuration of FIG. 5(B), the assembly work (installing the power supply cord) required steps for inserting and fixing a power supply cord 21 to a bushing 24, a primer processing step for the lamp body, a step for inserting the bushing 24, and a step for filling in an adhesive 27. This resulted in a large number of working man hours. Other technical problems also arose, such as that the holding strength of the power supply cord 21 is weak due to the fact that the adhesive 27 is filled from above the bushing 24.

SUMMARY OF THE INVENTION

The present invention has been made in order to solve the drawbacks of the prior art. Particularly, the present invention provides a back cover for a lamp body that ensures air tightness and waterproof performance at the power supply cord insertion location in the back cover for a lamp body of a vehicle lamp, and reduces the man hours required for fixing the power supply cord to the back cover.

Means described hereunder are adopted in order to achieve the above-mentioned goals.

In the back cover for a lamp body, an outer wall protrudes from a back face of the back cover so as to surround the cord insertion hole for inserting the power supply cord that supplies current to the light source bulb. A resin mold region for pouring and then curing a soft synthetic resin (hot melt resin) is formed inside of a space surrounded by the outer wall. The configuration replaces a bushing member, which was used in inserting and fixing the power supply cord to the back cover. Accordingly, the steps of inserting the power supply cord with respect to the bushing, or installing and fixing the bushing can be eliminated. As a result, the number of man hours required to install the power supply cords can be reduced while air tightness and waterproof performance can be ensured with a simple method of plugging the cord insertion hole portion with synthetic resin. The soft synthetic resin (hot melt resin) may suitably be, for example, polyamide hot melt resin, denatured olefin hot melt resin, and the like.

In another implementation of the back cover for a lamp body, a protruding inner wall is provided in a location away from the outer wall. The inner wall is located in the resin mold region formed by the outer wall surrounding the cord insertion hole formed in the back cover. The inner wall provided inside the resin mold region blocks the inward flow of the soft synthetic resin that is generated during cooling and fixing of the soft synthetic resin. Accordingly, shrinkage of the synthetic resin during cooling and fixing is controlled, so that a gap does not easily form between the cured synthetic resin and the outer wall or the like.

In another implementation of the back cover for a lamp body, the height of the inner wall provided in the resin mold region is shorter than that of the outer wall. In particular, if the height of the inner wall protruding from the back face of the back cover is denoted by h and the height of the outer wall is denoted by H, then h<H. Consequently, soft synthetic resin can be filled throughout the mold region surrounded by the outer wall even if the filling work is conducted from a single location. Moreover, by limiting the height h of the inner wall to within a predetermined range, portions not filled with the soft synthetic resin (such as gaps) inside the inner wall do not form easily. Also, even if a gap were to form in this inside region, air tightness and waterproof performance are not impacted.

As described above, the back cover for a lamp body according to the present invention simplifies the step for inserting and fixing the power supply cord to the back cover. Thus, assembly of the vehicle lamp achieves improved workability. Further, the structure contributes technically to the improvement of the quality of vehicle lamps through ensuring air tightness and waterproof performance of the lamp housing.

BRIEF DESCRIPTION OF THE DRAWINGS

FIG. 2(A) illustrates the state of the soft synthetic resin filled into the protrusion structure X according to a first embodiment of the present invention before cooling and curing.

FIG. 2(B) illustrates the state of the soft synthetic resin after cooling and curing.

DETAILED DESCRIPTION

Figure 1:
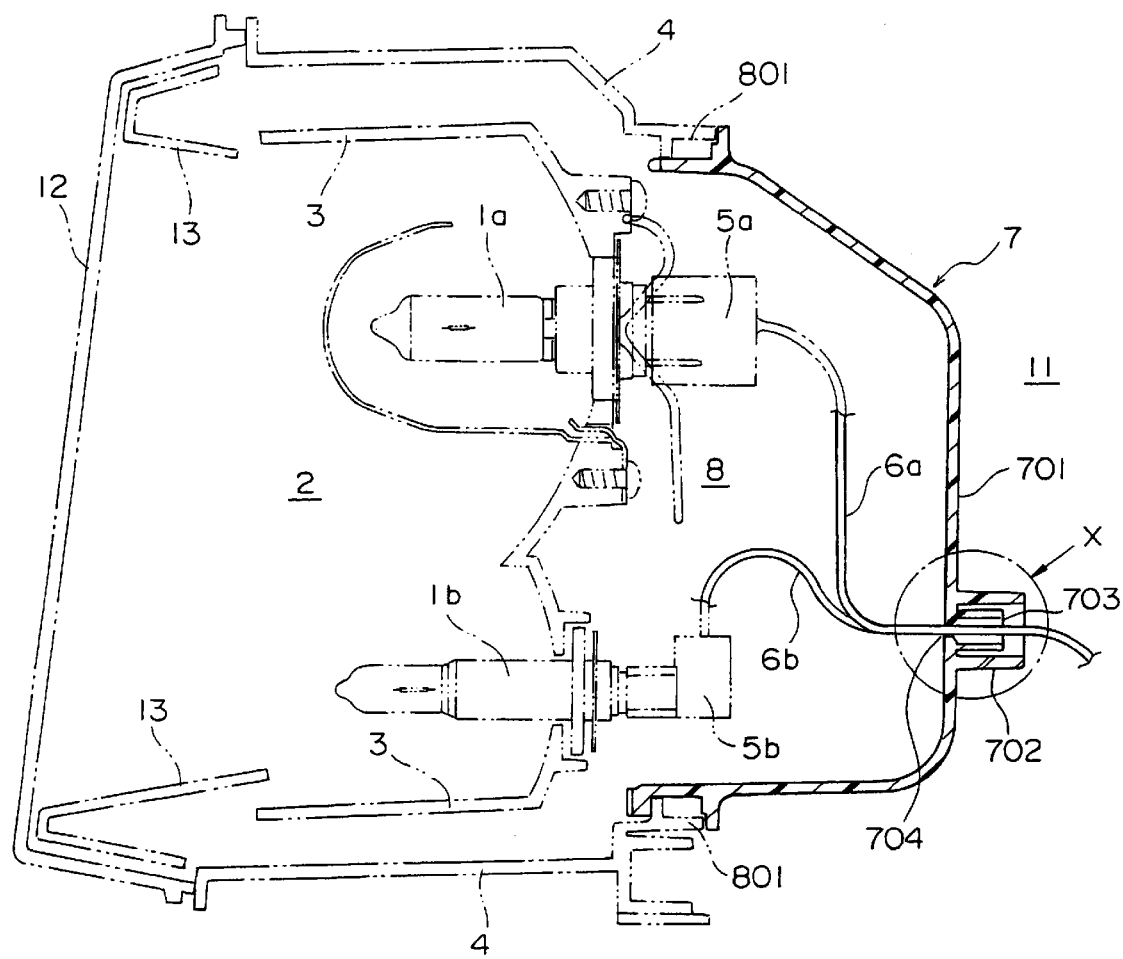
FIG. 1 is a longitudinal cross-sectional view of the back cover for a lamp body according to an implementation of the present invention as installed on a lamp body.

Embodiments of the present invention will now be described with reference to the attached drawings. FIG. 1 is a longitudinal sectional view of a back cover for a lamp body (hereafter simply referred to as the "back cover") shown in a state installed on a lamp body, using a headlamp of an automobile as an example.

In a housing 2 defined by a lamp body 4 and a front lens 12 (reference numeral 13 refers to an extension reflector), two light source bulbs (halogen lamps) 1a, 1b are disposed at the top and bottom of the housing 2 in a state fixed to a rear apex of a paraboloid reflector 3.

Connectors 5a, 5b of the light source bulbs 1a, 1b are connected to power supply cords 6a, 6b for supplying current from a light source, not shown, to the light source bulbs 1a, 1b. Specifically, the two power supply cords 6a, 6b are inserted into a cord insertion hole 704 (704a, 704b of FIG. 2A) formed in a back face 701 of a generally cup-shaped back cover 7. The back cover is engagingly fixed to a peripheral edge portion 801 of a light source bulb replacement opening 8 provided at the rear apex of the lamp body. Further, the power supply cords 6a, 6b are connected to the connectors 5a, 5n of the light source bulbs 1a, 1b.

The type and number of the light source bulb 1, installation method of the back cover 7 to the peripheral edge portion 801, the shape of the back cover 7, and the number of the cord insertion holes 704, and the like, are selectable as appropriate. Therefore, such elements are merely exemplary and do not affect the substance of the present invention in any way.

A specific "protrusion structure" indicated by the dotted-line circle labeled X in FIG. 1 is provided on the back face 701 of the back cover 7. The construction of this protrusion structure is the substance of the present invention. Hereafter, the specific construction of an implementation of the protrusion structure X will be described based on the illustrated embodiment.

FIG. 2(A) illustrates the state of a soft synthetic resin 9 filled in the above-mentioned protrusion structure $X_1$ according to a first embodiment of the present invention before cooling and curing. FIG. 2(B) illustrates the state of the soft synthetic resin 9 after cooling and curing.

The construction of a protrusion structure X according to the a embodiment will be described based on FIG. 2. The protrusion structure X is provided with an elliptic cylindrical outer wall 702a protruding perpendicularly from the back face 701 of the back cover 7.

At the back face 701 portion on the inside of the outer wall 702a, two cord insertion holes 704a, 704b are disposed in parallel at intervals. That is, the outer wall 702a is protrudingly provided so as to surround the two cord insertion holes 704a, 704b.

Soft synthetic resin (hot melt resin) 9 is poured (filled) into an inside region 705 surrounded by the outer wall 702(a) to be cooled and cured. In due course the soft synthetic resin 9 cures, and the soft synthetic resin 9 shrinks and tightens around the cords 6a, 6b. Accordingly, adhesion between the resin 9 and the cords 6a, 6b is improved while air tightness and waterproof performance are ensured by curing of the soft synthetic resin (hot melt resin) 9 filled into the cord insertion holes 704a, 704b. The inside region 705 thus functions as a (resin) mold region for the soft synthetic resin 9.

In a construction where an inner wall 703 (see FIG. 3 and FIG. 4), described later, is not provided to the inside of the outer wall 702a, as shown in FIG. 2(B), a gap 10 may form that communicates between an outside space 11 and the inside portion of the housing 2, throughout an inner wall surface region of the outer wall 702a to a region above the back face 701. When the soft synthetic resin 9 fills in the inside region 705 of the outer wall 702a, it flows and shrinks inwardly during the course of cooling and curing, which may cause the gap to be formed.

According to a second embodiment, inner walls 703a, 703b, described hereafter, are provided at the protrusion structure X so as to avoid formation of the gap 10. The construction of the second embodiment will be described in detail based on FIGS. 3(A) and 3(B) and FIGS. 4(A) and 4(B).

Figure 3A:
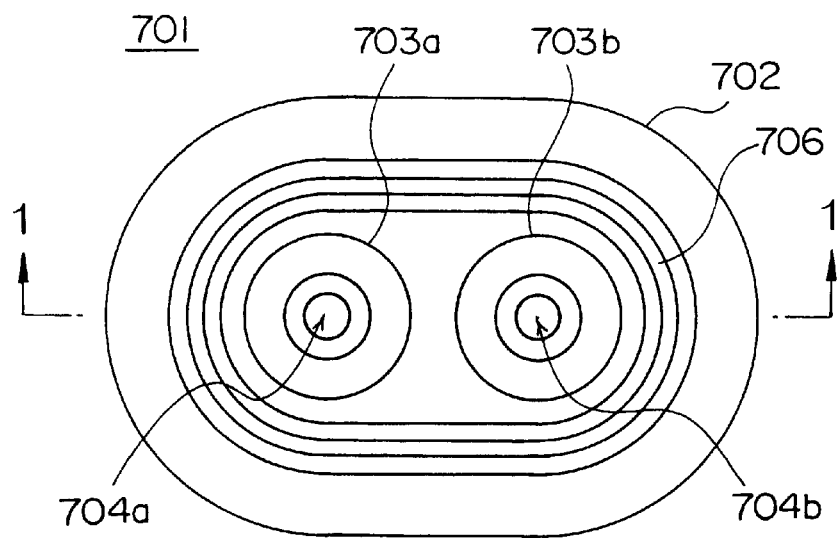
FIG. 3(A) is a front view of the protrusion structure X portion according to a second embodiment of the present invention as seen from directly above.
Figure 3B:
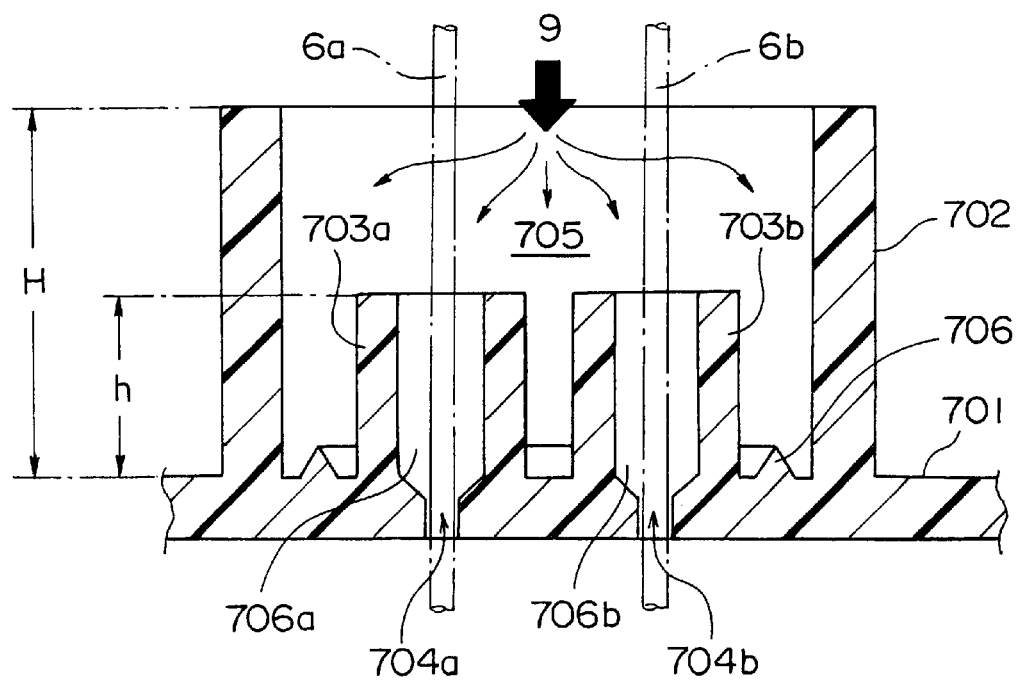
FIG. 3(B) is a longitudinal sectional view of the same X portion taken along line I—I of FIG. 3(A).
Figure 4A:
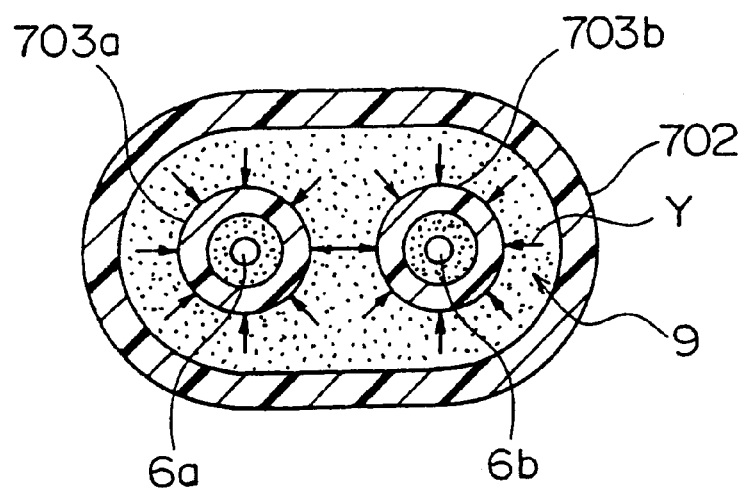
FIG. 4(A) is a plan view illustrating the state of the protrusion structure X portion after cooling and curing of the soft synthetic resin according to a second embodiment of the invention.
Figure 4B:
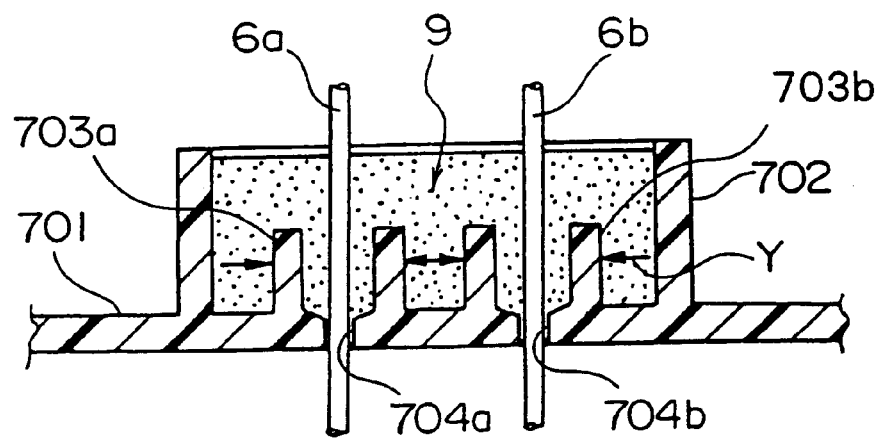
FIG. 4(B) is a longitudinal sectional view illustrating the state of the same protrusion structure X portion of FIG. 4(A).
Figure 5A:
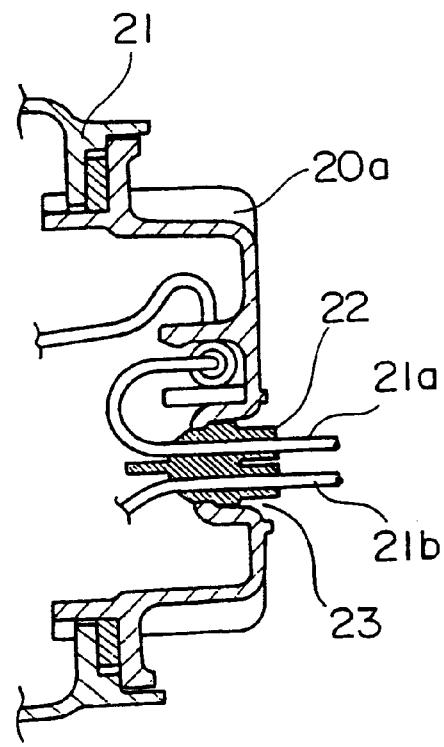
FIG. 5(A) is an illustration of a conventional first structure according to the related art.
Figure 5B:
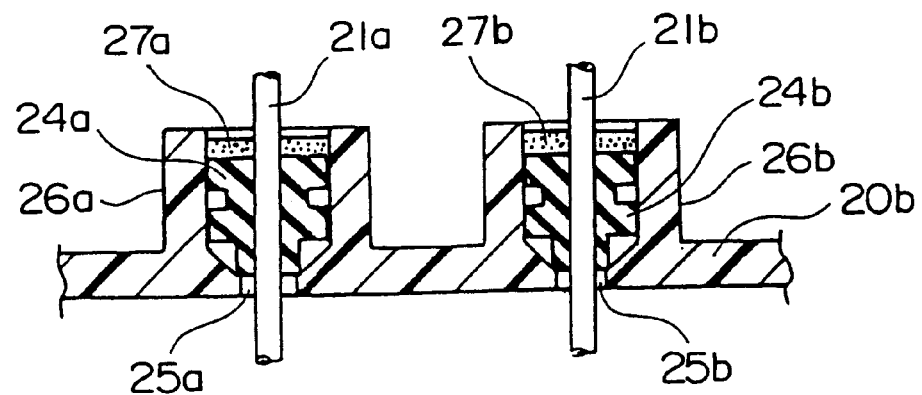
FIG. 5(B) is an illustration of a conventional second structure according to the related art.

FIG. 3(A) is a plan view of the above-mentioned protrusion structure $X_2$ portion according to a second embodiment as seen from directly above. FIG. 3(B) is a sectional view of the same structure X portion taken along line I—I of FIG. 3(A). FIG. 4(A) is a plan view showing a state of the protrusion structure $X_2$ after cooling and curing the soft synthetic resin according to the embodiment of the invention. FIG. 4(B) is a longitudinal cross-sectional view showing the state of the same protrusion structure $X_2$ as FIG. 4(A).

Around the respective peripheries of the cord insertion holes 704a, 704b shown in FIGS. 3(A) and 3(B) and FIGS. 4(A) and 4(B), cylindrical inner walls 703a, 703b are protrudingly provided on the back face 701 so as to surround the respective cord insertion holes 704a, 704b. The inner walls 703a, 703b are provided at locations away from the outer wall 702.

The two power supply cords 6a, 6b shown by imaginary lines in FIG. 3(B) pass through the respective inside regions 706a, 706b of the inner walls 703a, 703b to be inserted into the cord insertion holes 704a, 704b.

The number of cord insertion holes 704 does not necessarily have to be two, and therefore, it may be only one, or three or more, according to the number of power supply cords 6 (or the number of light source bulbs 1). The number of inner walls 703 should be provided in an amount corresponding to the number of the cord insertion holes 704.

Referring to FIGS. 3(A) and 3(B), a triangular projection 706 has an elliptic shape as viewed from above and is formed on the back face 701 inside of the outer wall 702 in a manner to surround the inner wall 703. The triangular projection 706 prevents the soft synthetic resin 9 on the inner peripheral surface of the outer wall 702 from shrinking, and further enhances air tightness and waterproof performance.

Describing in more detail, based mainly on FIGS. 4(A) and 4(B), the provision of the inner walls 703a, 703b effectively blocks and controls the resin flow in the direction of shrinking (see arrows Y in FIGS. 4(A) and 4(B)) during cooling and curing of the soft synthetic resin 9. Consequently, the generation of the gap 10 is prevented, which is a concern in the first embodiment.

Further, since the inside region (mold region) 705 can be partitioned (defined) by the inner walls 703a, 703b, an undesirable large (long) gap 10 does not form. A long gap 10 extending along the inner wall surface of the outer wall 702(a) to the cord insertion hole 704, can be seen in FIG. 2(B).

Even if a gap forms in the inner wall surface region of the inner walls 703a, 703b, air tightness and waterproof performance will not be affected since the gap will never become a gap 10 like that shown in FIG. 2B that communicates with the outside space 11.

When applying the soft synthetic resin 9 into the inside region 705 of the outer wall 702, it is preferable from the standpoint of workability that the soft synthetic resin 9 be poured (spread) throughout the entire inside region 705 from a single location. Accordingly, it is necessary to set the height h of the inner walls 703a, 703b from the back face 701 to be shorter than the height H of the outer wall 702 as measured from the back face 701.

Making the height h of the inner walls 703a, 703b too close to the height H of the outer wall 702 is not preferable, because then if a gap forms in the inner wall surface region of the inner walls 703a, 703b, such a gap would tend to easily communicate with the outside space 11.

Experiments have been conducted, and it was found that the difference between the height H of the outer wall 702 and the height h of the inner walls 703a, 703b should suitably be 0.5 cm or more. In addition, the height h of the inner wall can suitably be a value equal to or less than 1.0 cm.

In the back cover for a lamp body according to the present invention, soft synthetic resin is filled and cured inside the outer wall to surround the power supply cord insertion hole and the power supply cord. Consequently, a bushing member is totally unnecessary for inserting and fixing the power supply cord. As a result, the work of installing the power supply cord to the back cover is simplified and facilitated.

The conventionally used rubber bushing member and the synthetic resin back cover differed in material, which resulted in a gap that tended to form at an engagement portion therebetween. Thus, ensuring air tightness and waterproof performance was difficult. However, by adopting the simple method of plugging the cord insertion hole portion by using a curing synthetic resin, it became possible to easily ensure air tightness and waterproof performance.

Further, the structure of the back cover for a lamp body according to the present invention includes an inner wall protrudingly in the resin mold region formed by the outer wall surrounding the cord insertion hole, such that the outer wall and the inner wall are away from each other. The structure allows for controlling shrinking of the soft synthetic resin filled in the resin mold region during cooling and curing. Moreover, since a gap does not easily form between the cured synthetic resin and the outer wall or the like, air tightness and waterproof performance can be ensured.

Since the inner wall is shorter than the outer wall, the soft synthetic resin can be applied from a single location to fill the entire mold region surrounded by the outer wall with resin, which is advantageous in terms of workability.

Further, by limiting the height of the inner wall, portions not filled with soft synthetic resin are not easily generated. Yet further, even if a gap were to form in the inside region of the inner wall, air tightness and waterproof performance would not be affected since a distance is secured from this gap to the top face of the synthetic resin filled inside the mold region.

Quality in terms of air tightness and waterproof performance can be improved with a vehicle lamp provided with the back cover for a lamp body according to the present invention having the above-mentioned effects.

What is claimed is:

1. A back cover structure for a lamp body provided with at least one cord insertion hole for inserting at least one power supply cord that supplies current to a light source bulb comprising:

a protruding outer wall attached to a back face of the lamp body that surrounds the cord insertion hole, a resin mold region formed inside the outer wall for filling and curing a soft synthetic resin therein, and a protruding inner wall attached to the back face and provided in the resin mold region at a position spaced away from the outer wall.

2. The back cover structure for a lamp body according to claim 1, wherein the height of the inner wall is shorter than the height of the outer wall.

3. A method for providing a back cover for a lamp busy comprising:

providing an outer wall attached to a back face of the lamp body that forms an inner mold region surrounding at least one cord insertion hole;

inserting a power supply cord through the cord insertion hole;

filling the inner mold region with a soft synthetic resin to surround the cord and to cover the cord insertion hole; and cooling and curing the synthetic resin to provide an airtight and waterproof seal.

4. The method of claim 3, further comprising providing a protruding inner wall inside the outer wall, wherein the inner wall surrounds the cord insertion hole.

5. The back cover structure for a lamp body according to claim 1 further comprising a triangular projection surrounding the protruding inner wall.

\* \* \* \* \*